(12) United States Patent
Yun et al.

(10) Patent No.: US 9,955,441 B2
(45) Date of Patent: Apr. 24, 2018

(54) RECEIVING METHOD AND APPARATUS (71) Applicant: Samsung Electronics Co., Ltd., Suwon-si (KR)

(72) Inventors: Seok-Ju Yun, Hwaseong-si (KR); Joonseong Kang, Suwon-si (KR); Young-Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/058,320

(22) Filed: Mar. 2, 2016

(65) Prior Publication Data

US 2017/0034796 A1   Feb. 2, 2017

(30) Foreign Application Priority Data

Jul. 28, 2015   (KR) ........................ 10-2015-0106362

(51) Int. Cl.
*H04W 52/52* (2009.01)
*H04B 1/16* (2006.01)
*H04W 52/24* (2009.01)

(52) U.S. Cl.
CPC .............. *H04W 52/52* (2013.01); *H04B 1/16* (2013.01); *H04W 52/245* (2013.01)

(58) Field of Classification Search
CPC ................................. H04B 1/16; H04W 52/52
See application file for complete search history.

(56) References Cited

U.S. PATENT DOCUMENTS

| | | | |
|---|---|---|---|
| 3,973,260 A | 8/1976 | Costantini et al. | |
| 4,107,613 A | 8/1978 | Queen et al. | |
| 4,186,351 A | 1/1980 | Brefini et al. | |
| 4,194,200 A | 3/1980 | Goldie | |
| 4,313,218 A | 1/1982 | O'Donnell, Jr. et al. | |
| 4,339,728 A | 7/1982 | Monticelli | |
| 4,408,229 A | 10/1983 | Harford | |

(Continued)

FOREIGN PATENT DOCUMENTS

| KR | 10-0379490 B1 | 4/2003 |
|---|---|---|
| KR | 10-1509498 B1 | 4/2015 |

OTHER PUBLICATIONS

Wong, Alan, et al. "A 1V 5mA multimode IEEE 802.15. 6/bluetooth low-energy WBAN transceiver for biotelemetry applications." *Solid-State Circuits Conference Digest of Technical Papers (ISSCC), 2012 IEEE International, Session 17.* IEEE, pp. 300-302, 2012, Abingdon, United Kingdom.

(Continued)

*Primary Examiner* — Jaison Joseph
(74) *Attorney, Agent, or Firm* — NSIP Law (57) ABSTRACT

Provided is a receiver configured to perform automatic gain control (AGC), the receiver including a first variable gain amplifier configured to amplify, according to a first variable gain, a signal of a first frequency band, a second variable gain amplifier configured to amplify, according to a second variable gain, a signal of a second frequency band generated by frequency converting the amplified signal of the first frequency band, and an AGC circuit configured to control a total gain by controlling a gain ratio between the first variable gain and the second variable gain to be within a set target range by adjusting at least one of the first variable gain and the second variable gain.

19 Claims, 9 Drawing Sheets

(56) References Cited

U.S. PATENT DOCUMENTS

| | | | |
|---|---|---|---|
| 4,411,019 A | 10/1983 | Rypkema | |
| 4,472,739 A | 9/1984 | Kishida et al. | |
| 4,479,233 A | 10/1984 | Loughlin | |
| 4,536,885 A | 8/1985 | Loughlin | |
| 4,731,838 A | 3/1988 | Amemiya et al. | |
| 4,811,423 A | 3/1989 | Eastmond | |
| 4,901,332 A | 2/1990 | Williams et al. | |
| 5,029,182 A | 7/1991 | Cai et al. | |
| 5,146,338 A | 9/1992 | Lehmann et al. | |
| 5,263,186 A | 11/1993 | Gornati et al. | |
| 5,267,272 A | 11/1993 | Cai et al. | |
| 5,339,453 A | 8/1994 | Sugayama et al. | |
| 5,507,023 A | 4/1996 | Suganuma et al. | |
| 5,509,030 A | 4/1996 | Mortensen | |
| 5,724,652 A | 3/1998 | Graham et al. | |
| 5,742,899 A | 4/1998 | Blackburn et al. | |
| 5,764,309 A | 6/1998 | Krishnamurthy et al. | |
| 5,841,820 A | 11/1998 | Krishnamurthy et al. | |
| 6,107,878 A | 8/2000 | Black | |
| 6,239,848 B1 | 5/2001 | Mycynek et al. | |
| 6,304,615 B1 | 10/2001 | Webster | |
| 6,324,230 B1 | 11/2001 | Graham et al. | |
| 6,333,765 B1 | 12/2001 | Okada et al. | |
| 6,418,303 B1 | 7/2002 | Blackburn et al. | |
| 6,501,792 B2 | 12/2002 | Webster | |
| 6,853,837 B1 | 2/2005 | Oda | |
| 6,862,438 B2 | 3/2005 | Darabi | |
| 6,977,976 B1 | 12/2005 | Birkett et al. | |
| 6,978,117 B2 | 12/2005 | Zerod et al. | |
| 6,985,707 B2 | 1/2006 | Kasperkovitz | |
| 7,035,610 B2 | 4/2006 | Tsushima | |
| 7,039,376 B2 | 5/2006 | Isoda | |
| 7,050,774 B2 | 5/2006 | Tominaga | |
| 7,116,955 B2 | 10/2006 | Schaffer et al. | |
| 7,149,263 B2 | 12/2006 | Higure | |
| 7,212,798 B1* | 5/2007 | Adams | H03G 3/3068 330/278 |
| 7,227,915 B2 | 6/2007 | Wakimoto et al. | |
| 7,302,241 B2 | 7/2007 | Koenig | |
| 7,372,925 B2 | 5/2008 | Pipilos | |
| 7,415,083 B2 | 8/2008 | Anderson | |
| 7,496,163 B2 | 2/2009 | Terao | |
| 7,515,891 B2 | 4/2009 | Darabi | |
| 7,570,934 B2 | 8/2009 | Shalash | |
| 7,590,205 B2 | 9/2009 | Zipper | |
| 7,593,484 B2 | 9/2009 | Beamish et al. | |
| 7,668,523 B2 | 2/2010 | Adams et al. | |
| 7,676,207 B2 | 3/2010 | Ismail et al. | |
| 7,689,217 B2 | 3/2010 | Ruelke et al. | |
| 7,769,357 B2 | 8/2010 | Lai et al. | |
| 7,796,713 B2 | 9/2010 | Lee | |
| 7,809,343 B2 | 10/2010 | Lai et al. | |
| 7,929,650 B2 | 4/2011 | Sobchak et al. | |
| 7,978,773 B2 | 7/2011 | Lai et al. | |
| 8,032,099 B2 | 10/2011 | Chang | |
| 8,320,865 B2 | 11/2012 | Bjork | |
| 8,391,374 B2* | 3/2013 | Husted | H03G 3/3068 375/252 |
| 8,391,384 B2 | 3/2013 | Lai et al. | |
| 8,577,319 B2* | 11/2013 | Ling | H03G 3/3068 455/240.1 |
| 9,002,308 B1 | 4/2015 | Zocher et al. | |
| 2009/0141177 A1 | 6/2009 | Chang | |
| 2011/0140778 A1* | 6/2011 | Cho | H03G 3/3078 330/129 |
| 2011/0255642 A1* | 10/2011 | Nagai | H03G 3/3068 375/345 |
| 2015/0044980 A1* | 2/2015 | Eddowes | H03G 3/3068 455/226.2 |

OTHER PUBLICATIONS

Liu, Yao-Hong, et al. "A 1.9 nJ/b 2.4 GHz multistandard (Bluetooth Low Energy/Zigbee/IEEE802. 15.6) transceiver for personal/body-area networks." *Solid-State Circuits Conference Digest of Technical Papers (ISSCC), 2013 IEEE Session 25 International*. IEEE,, pp. 446-448 2013, Eindhoven, The Netherlands.

* cited by examiner

RECEIVING METHOD AND APPARATUS

CROSS-REFERENCE TO RELATED APPLICATION(S)

This application claims the benefit under 35 USC 119(a) of Korean Patent Application No. 10-2015-0106362, filed on Jul. 28, 2015 in the Korean Intellectual Property Office, the entire disclosure of which is incorporated herein by reference for all purposes.

BACKGROUND

1. Field

The following description relates to a receiving method and apparatus to receive a wireless communication signal, and more particularly, to a receiving method and apparatus to receive a wireless communication signal with automatic gain control (AGC).

2. Description of Related Art

An output signal of a receiver may require an amplitude having a predetermined value irrespective of a strength of an input signal of the receiver. Also, the output signal of the receiver may be required to have a particular signal-to-noise ratio (SNR) performance. Accordingly, a gain of an amplifier in the receiver having a ratio to amplify a strength of a signal in response to a strength of a received input signal may be variably controlled.

An automatic gain controller (AGC) may be used to automatically control a gain of the receiver may adjust the gain of the amplifier in the receiver in response to the strength of the received input signal.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

One or more embodiments provide a receiver to perform an automatic gain control (AGC), the receiver including a first variable gain amplifier configured to amplify, according to a first variable gain, a signal of a first frequency band, a second variable gain amplifier configured to amplify, according to a second variable gain, a signal of a second frequency band generated by frequency converting the amplified signal of the first frequency band, and an AGC circuit configured to control a total gain by controlling a gain ratio between the first variable gain and the second variable gain to be maintained within a set target range by adjusting at least one of the first variable gain and the second variable gain.

The first frequency band may correspond to at least one of a wireless frequency band and an intermediate frequency band, and the second frequency band may correspond to a base band.

The AGC circuit may control the total gain to increase by a unit step through the adjusting, e.g., with the adjusting further including selectively increasing the first variable gain while maintaining the second variable gain and increasing the second variable gain while maintaining the first variable gain.

The AGC circuit may control the total gain to increase by a unit step for a plurality of times through the adjusting, e.g., with the adjusting further including alternately increasing the first variable gain and the second variable gain.

A unit step of the first variable gain amplifier and a unit step of the second variable gain amplifier may be respectively set by the AGC circuit so the total gain respectively changes by a predetermined unit step.

The receiver may further include a gain ratio controller (GRC) configured to adjust the target range.

The receiver may further include an interference detector configured to detect an interference from the signal of the second frequency band and to determine whether the detected interference meets a threshold, wherein the GRC may be configured to selectively adjust the target range based on the determination.

The interference detector may include a filter and a received signal strength indicator (RSSI), e.g., with the RSSI being configured to measure a signal strength of the signal of the second frequency band.

One or more embodiments provide a receiver to perform an automatic gain control (AGC), the receiver including a first variable gain amplifier configured to amplify, according to a first variable gain, a signal of a wireless frequency band, a second variable gain amplifier configured to amplify, according to a second variable gain, a signal of an intermediate frequency band generated by frequency converting the amplified signal of the wireless frequency band, a third variable gain amplifier configured to amplify, according to a third variable gain, a signal of a base band generated by frequency converting the amplified signal of the intermediate frequency band, and an AGC circuit configured to control a total gain by controlling a gain ratio between a sum of both of the first variable gain and the second variable gain and the third variable gain to be maintained by selectively adjusting at least one of the first variable gain, the second variable gain, and the third variable gain.

The AGC circuit may control the total gain to increase by a unit step through the selective adjusting, e.g., with the selective adjusting further including selectively increasing the sum of both of the first variable gain and the second variable gain while maintaining the third variable gain and increasing the third variable gain while maintaining the sum of both of the first variable gain and the second variable gain.

The AGC circuit may control the total gain to increase by a unit step for a plurality of times through the selective adjusting, e.g., with the adjusting further including alternately increasing the sum of both of the first variable gain and the second variable gain and the third variable gain.

A unit step of the second variable gain amplifier and a unit step of the third variable gain amplifier may be respectively set by the AGC circuit so the total gain respectively changes by a predetermined unit step.

The receiver may further include a gain ratio controller (GRC) configured to adjust the target range.

The receiver may further include an interference detector configured to detect an interference from the signal of the base band and to determine whether the detected interference meets a threshold, e.g., wherein the GRC is configured to selectively adjust the target range based on the determination.

One or more embodiments provide a receiving method with automatic gain control (AGC), the method including setting a total gain based on a strength of a received signal of a first frequency band, and generating an output signal by selectively adjusting, according to the set total gain, at least one of a first variable gain of a first variable gain amplifier configured to amplify the signal of the first frequency band and a second variable gain of a second variable gain amplifier configured to amplify a signal of a second frequency band generated by frequency converting the amplified signal of the first frequency band.

The method may further include setting the total gain so an output signal strength of the output signal is maintained and amplifying the signal of the first frequency band using the first variable gain and the signal of the second frequency band using the second variable gain based on the selective adjusting.

The adjusting may further include controlling a gain ratio between the first variable gain and the second variable gain to be maintained within a set target range.

The method may further include determining the strength of the received signal of the first frequency band and setting the target range based on the determination.

The method may further include controlling the total gain to increase by a unit step through the adjusting selectively increasing the first variable gain while maintaining the second variable gain and increasing the second variable gain while maintaining the first variable gain.

The method may further include controlling the total gain to increase by a unit step for a plurality of times through the adjusting alternately increasing the first variable gain and the second variable gain.

Other features and aspects will be apparent from the following detailed description, the drawings, and the claims.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein may then be apparent to one of ordinary skill in the art. The sequences of operations described herein are merely non-limiting examples, and are not limited to those set forth herein, but may be changed as will be apparent to one of ordinary skill in the art, with the exception of operations necessarily occurring in a certain order, after an understanding of the present disclosure. Also, descriptions of functions and constructions that may be understood, after an understanding of differing aspects of the present disclosure, may be omitted in some descriptions for increased clarity and conciseness.

Various alterations and modifications may be made to embodiments, some of which will be illustrated in detail in the drawings and detailed description. However, it should be understood that these embodiments are not construed as limited to the disclosure and illustrated forms and should be understood to include all changes, equivalents, and alternatives within the idea and the technical scope of this disclosure.

Terms used herein are to merely explain specific embodiments, thus it is not meant to be limiting. A singular expression includes a plural expression except when two expressions are contextually different from each other. For example, as used herein, the singular forms "a", "an", and "the" are intended to include the plural forms as well, unless the context clearly indicates otherwise. Herein, a term "include" or "have" are also intended to indicate that characteristics, figures, operations, components, or elements disclosed on the specification or combinations thereof exist. The term "include" or "have" should be understood so as not to pre-exclude existence of one or more other characteristics, figures, operations, components, elements or combinations thereof or additional possibility. In addition, though terms such as first, second, A, B, (a), (b), and the like may be used herein to describe components, unless indicated otherwise, these terminologies are not used to define an essence, order, or sequence of a corresponding component but used merely to distinguish the corresponding component from other component(s).

Unless otherwise defined, all terms including technical and scientific terms used herein have the same meaning as commonly understood by one of ordinary skill in the art to which respective embodiments belong. It will be further understood that terms, such as those defined in commonly-used dictionaries, should be interpreted as having a meaning that is consistent with their meaning in the context of the relevant art and the present disclosure and will not be interpreted in an idealized or overly formal sense unless expressly so defined herein.

When describing the examples with reference to the accompanying drawings, like reference numerals refer to like constituent elements and a repeated description related thereto may be omitted. When it is determined that a detailed description related to an understood or previously discussed operation or configuration may make a purpose of a subsequent embodiment unnecessarily ambiguous in describing the embodiment, such a detailed description may be omitted.

Figure 1:
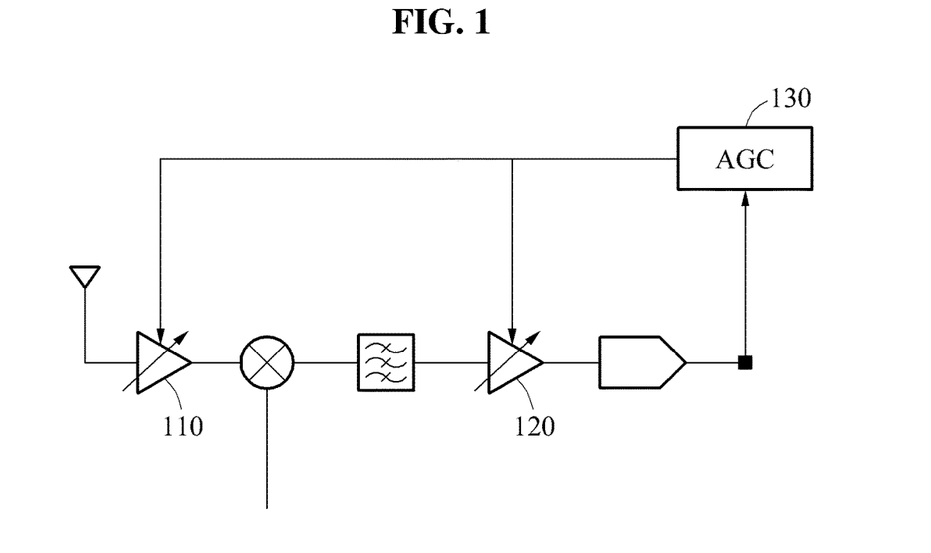
FIG. 1 is a diagram illustrating a receiver system, in accordance with one or more embodiments.

FIG. 1 is a diagram illustrating a receiver system, in accordance with one or more embodiments. A receiver embodiment may include automatic gain controller (AGC) hardware to control a variable gain amplifier in each of different frequency bands. Hereinafter, an AGC may indicate hardware of an automatic gain control or an automatic gain controller. The block diagram of FIG. 1 illustrates the receiver with plural variable amplifiers and an AGC, and represents that there may also be additional aspects of the receiver system in addition to the plural variable amplifiers and the AGC, depending on embodiment. Herein, the terms receiver system and receiver may have the same meaning. In one or more embodiments, the receiver receives an input RF signal, and amplifiers the signal in a plurality of frequency bands, such that an output signal has a required or desired amplitude. Accordingly, the AGC may control a plurality of variable gain amplifiers to amplify a signal in the plurality of frequency bands.

For example, the receiver may amplify a signal of a first frequency band received from an antenna according to a first variable gain in the first frequency band using a first variable gain amplifier 110. The receiver generates a signal of a second frequency band by frequency converting the signal of the first frequency band amplified by the first variable gain amplifier 110. The receiver may amplify the signal of the second frequency band according to a second variable gain in the second frequency band using a second variable gain amplifier 120. The receiver may generate an output signal by digitizing the signal of the second frequency band amplified by the second variable gain amplifier 120. The AGC 130 may control the first variable gain and the second variable gain such that the output signal has a required or desired amplitude, for example. In an embodiment, the first frequency band corresponds to at least one of a wireless frequency band and an intermediate frequency band and the second frequency band corresponds to a base band.

Figure 2:
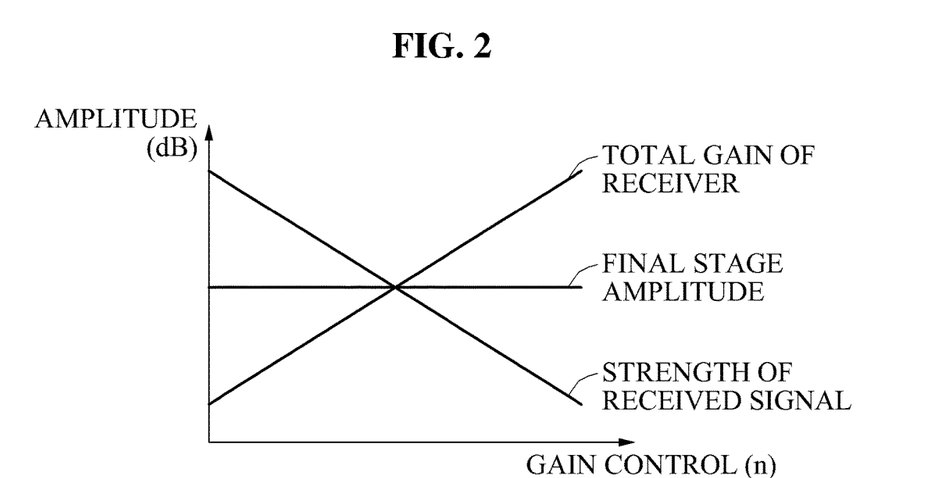
FIG. 2 is a graph illustrating a gain control of a receiver, in accordance with one or more embodiments.

FIG. 2 is a graph illustrating a gain control of a receiver, in accordance with one or more embodiments. FIG. 2 illustrates a total gain of a receiver that may be implemented based on a strength of a received signal for regularly maintaining a flat or constant (or near constant) final stage amplitude of an output signal. To achieve the maintained final stage amplitude, when the strength of the received signal is high, the total gain of the receiver is set to be relatively low. Likewise, to achieve the maintained final stage amplitude, when the strength of the received signal is low, the total gain of the receiver is set to be relatively high. In general, when a total gain of a receiver is controlled to be high, an amount of power consumption of the receiver may increase.

Figure 6:
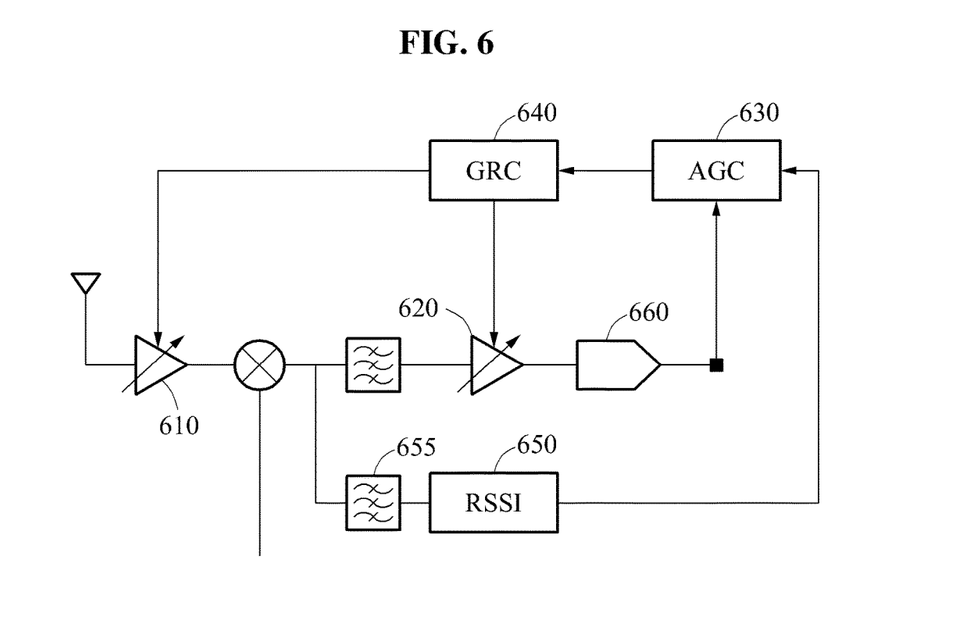
FIG. 6 is a diagram illustrating a receiver system, in accordance with one or more embodiments.
Figure 7:
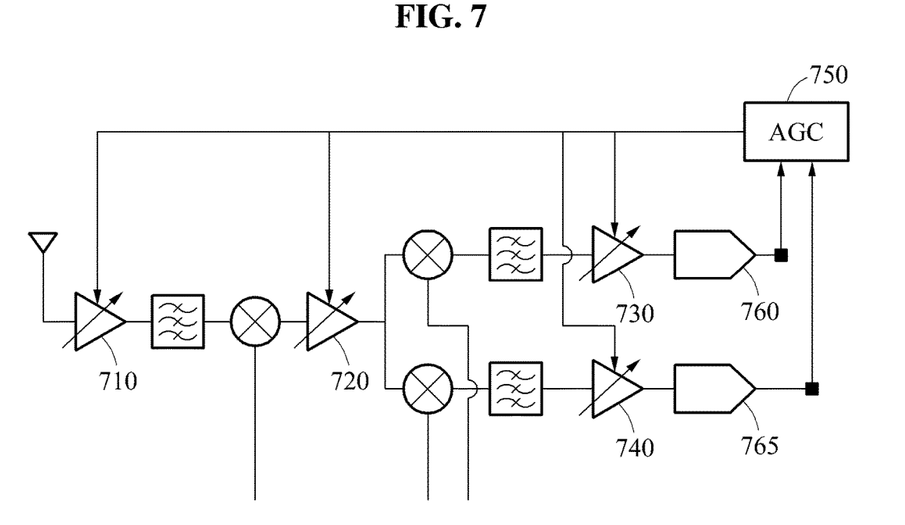
FIG. 7 is a diagram illustrating a receiver system, in accordance with one or more embodiments.

For example, considering the receiver system of FIG. 1, 6, or 7, as only examples, a variable gain contributed to the total gain may include a controlled variable gain of the wireless frequency band, a controlled variable gain of the intermediate frequency band, and a controlled variable gain of the base band. A total gain of the receiver $G_T[n]$ may be expressed as shown below in Equation 1, for example.

$$G_T[n] = g_0 + \sum_{i=1}^{I} (g_{RFi}) + \sum_{j=1}^{J} (g_{IFj}) + \sum_{k=1}^{K} (g_{BBk}) \quad \text{Equation 1}$$

In Equation 1, $g_0$ denotes a gain element excluding a variable gain element, and $g_{RFi}$, $g_{IFj}$, and $g_{BBk}$ denote a variable gain of a wireless frequency band, a variable gain of an intermediate frequency band, and a variable gain of a base band, respectively. Each of I, J, and K denotes a number of stages of an amplifier in a respective band.

In a receiver in a multi stage system, a total noise figure F may be expressed as shown below in Equation 2, for example.

$$F = F_1 + \frac{F_2 - 1}{G_1} + \frac{F_3 - 1}{G_1 G_2} + \ldots + \frac{F_n - 1}{G_1 G_2 \ldots G_{n-1}} \quad \text{Equation 2}$$

In Equation 2, $F_n$ denotes a noise figure in an $n^{th}$ block, and $G_n$ denotes a gain in the $n^{th}$ block. As shown in Equation 2, a total noise figure of the receiver may be obtained based on a combination of respective noise figures and gains. Accordingly, when a gain ratio between each block of the receiver changes, the total noise figure of the receiver may change even though the total gain may be maintained constant or nearly constant. In a receiver having a variable gain of a wireless frequency band and a variable gain of a base band, a gain ratio GR[n] may be expressed as shown below in Equation 3, for example.

$$GR[n] = \sum_{i=1}^{I} (g_{RFi}) \bigg/ \left( \sum_{k=1}^{K} (g_{BBk}) + \sum_{i=1}^{I} (g_{RFi}) \right) \quad \text{Equation 3}$$

A non-linearity of the receiver may be a disadvantage when a receiving sensitivity and a power consumption of the receiver are desired to be optimized. Therefore, when optimization of the receiving sensitivity and the power consumption of the receiver are desired, performance improvements may be expected when gain control is implemented with enhanced linearity of the total noise figure of the receiver.

Figure 3A:
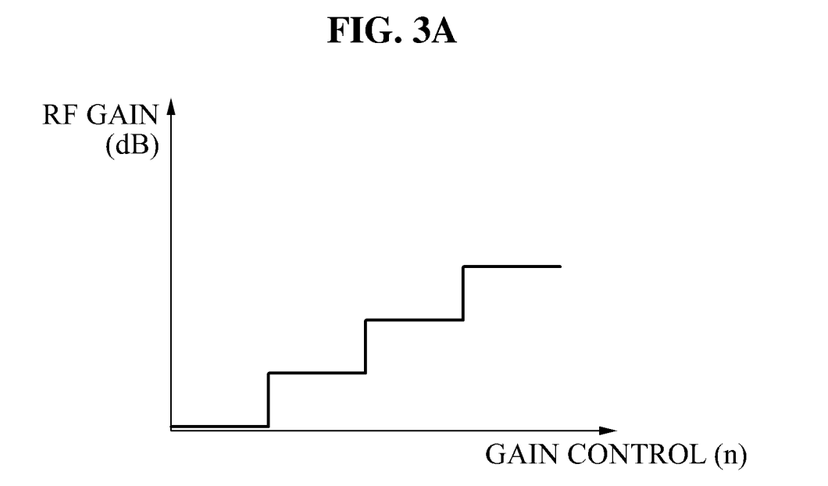
FIGS. 3A through 3D are graphs illustrating a gain control implementation and corresponding noise figure, in accordance with one or more embodiments.
Figure 3B:
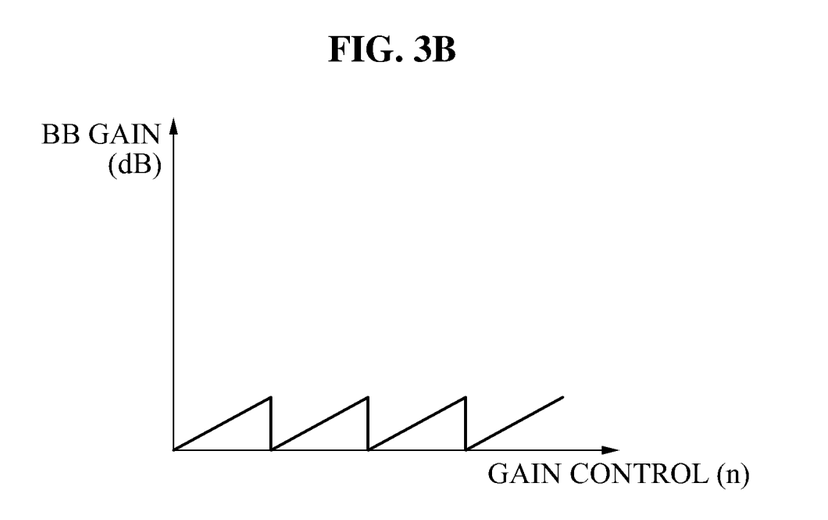

FIGS. 3A through 3D are graphs illustrating a gain control implementation and corresponding noise figure, in accordance with one or more embodiments. Herein, the unit step refers to a respective minimum unit of a variable gain controllable by an AGC. As illustrated in FIG. 3A, the controlled gain of the wireless or RF frequency band has a relatively large unit step. As illustrated in FIG. 3B, a gain of a base band has a relatively small or fine unit step, e.g., relative to the large unit step of the gain applied to the wireless or RF frequency band. As only an example, a total gain of the receiver may be obtained as illustrated in FIG. 2 based on this gain implementation.

Figure 3C:
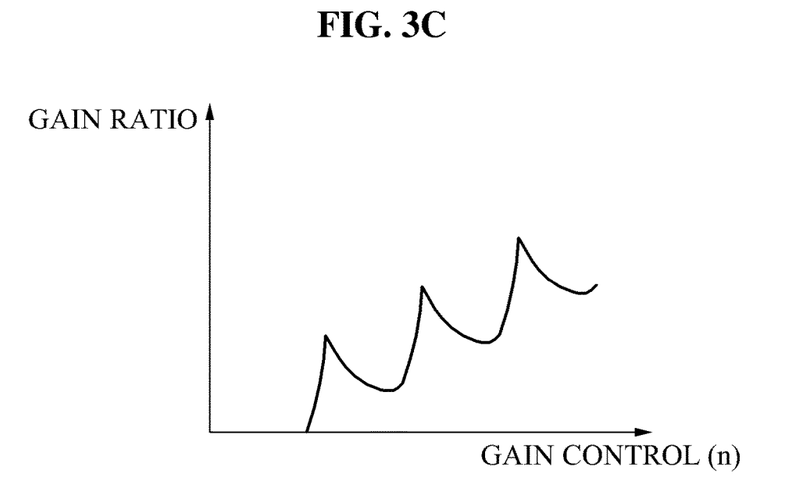
Figure 3D:
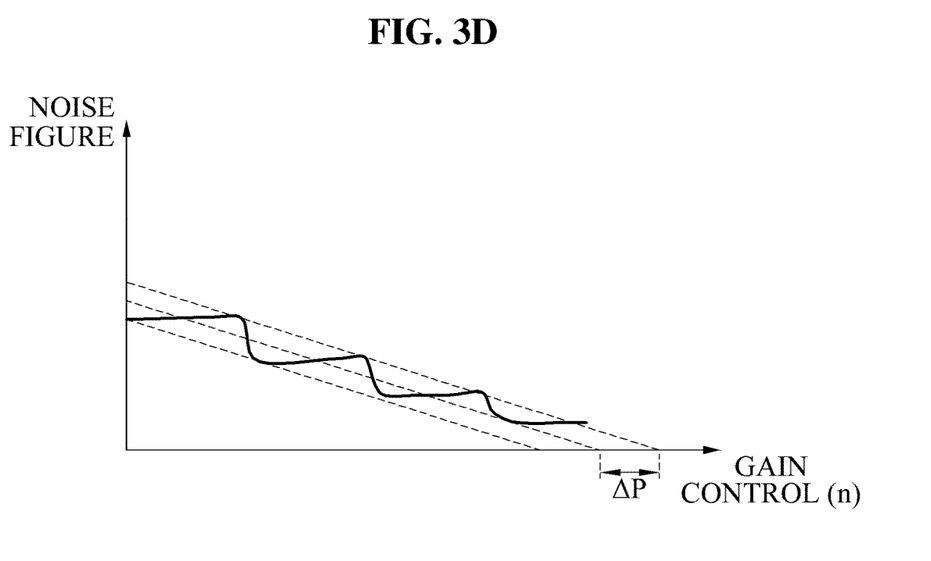

However, as illustrated in FIG. 3C, with such different gain steps of FIGS. 3A and 3B, a gain ratio between a corresponding gain of the wireless frequency band and a corresponding gain of the base band, according to an increase in the total gain of the receiver, has non-linear characteristics. Thus, there occurs an interval of time during which the gain ratio has large changes, when the gain of the wireless frequency band increases or decreases in the relatively large unit steps. Therefore, as illustrated in FIG. 3D, a corresponding total noise figure with non-linear characteristics can be expected according to the increase in the total gain of the receiver. The non-linearity characteristic of the noise figure may be a disadvantage when a power consumption of the receiver is desired to be optimized. In FIG. 3D, when the total gain of the receiver is set based on a point at which the noise figure is high, a performance loss may occur by ΔP in comparison with a more linear noise figure, such as discussed below with regards to the illustrated linear noise figure of FIG. 4D.

Figure 4A:
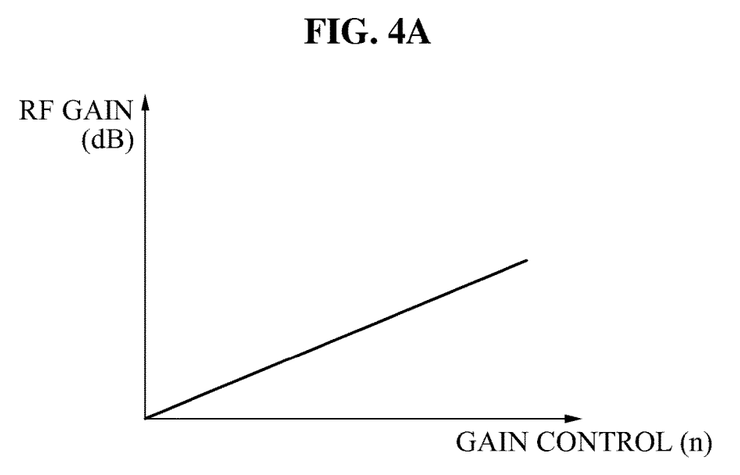
FIGS. 4A through 4D are graphs illustrating a gain control implementation and corresponding noise figure, in accordance with one or more embodiments.
Figure 4B:
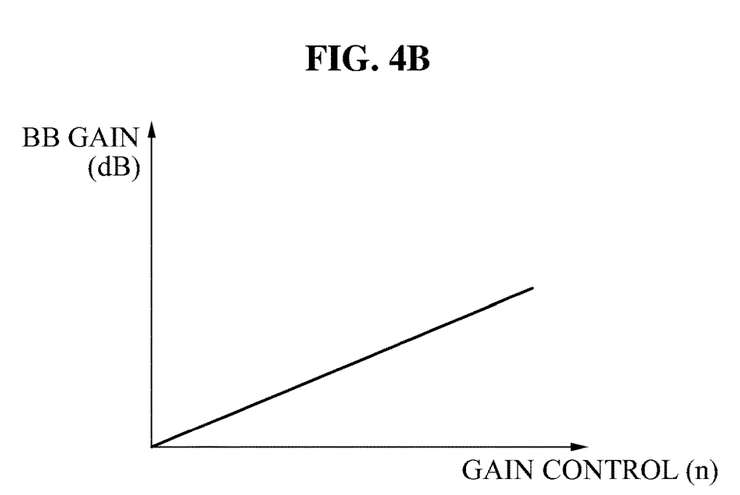

FIGS. 4A through 4D are graphs illustrating a gain control implementation and corresponding noise figure, in accordance with one or more embodiments. As illustrated in FIGS. 4A and 4B, both of the gain of a wireless frequency band and a gain of a base band are provided to have respective fine unit steps, e.g., relative to the large unit steps discussed above with regard to FIG. 3A. In an embodiment, each of a unit step of the gain of the wireless frequency band and a unit step of the gain of the base band may be selected as a value designed to increase an amount of change in the total gain of the receiver by a predetermined unit step. As a non-limiting example, the unit step of the gain of the wireless frequency band and the unit step of the gain of the base band may be provided to be identical.

Figure 4C:
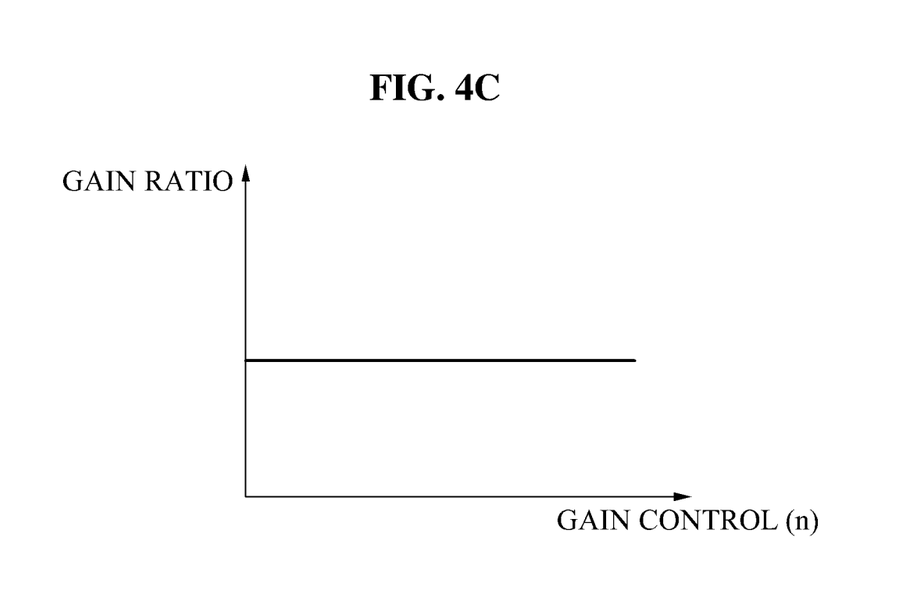

Accordingly, FIG. 4C illustrates that a corresponding gain ratio between the gain of the wireless frequency band and the gain of the base band, according to an increase in the total gain of the receiver, may be controlled to have a predetermined value, e.g., without intervals of time during which there are drastic changes to the gain ratio. In an embodiment and only as an example, the gain ratio to be ideally achieved is illustrated in FIG. 4C, though the gain ratio may be controlled to be maintained within a predetermined target range, e.g., in an actual implementation. Herein, the gain ratio target range may refer to a range in which the gain ratio may be ideally achieved is a goal value, for example, while an acceptable value may fall between a maximum or minimum value respectively above and below that goal value, according to a desired performance.

Figure 4D:
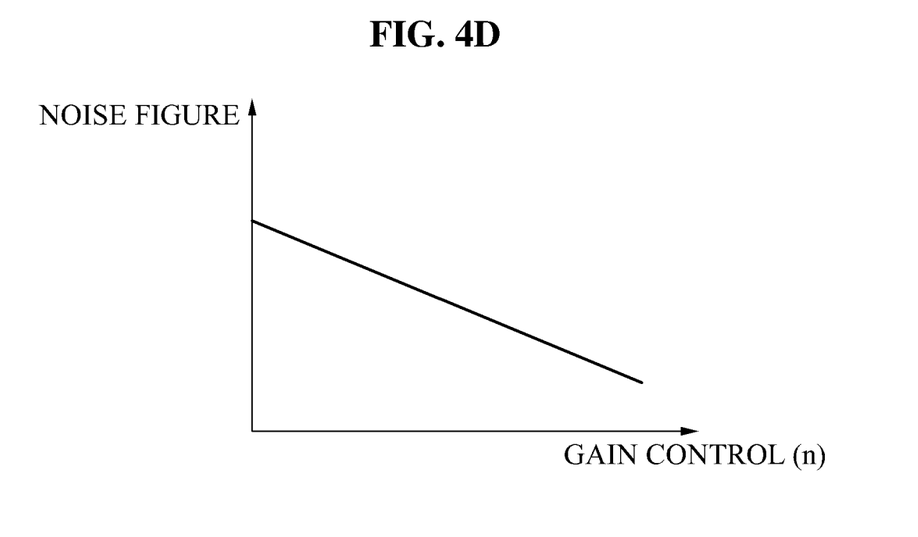

As noted, since the gain ratio does not include intervals with drastically changing values, the corresponding total noise figure, according to the increase in the total gain of the receiver, has a linear characteristic as illustrated in FIG. 4D. A noise figure with linear characteristics may be of an advantage when the power consumption of the receiver is desired to be optimized. For example, with a receiver controlled to implement gain control according to FIGS. 4A-4C, performance improvement may be expected by ΔP in comparison with a receiver being gain controlled so as to have the noise figure illustrated in FIG. 3D.

Figure 5A:
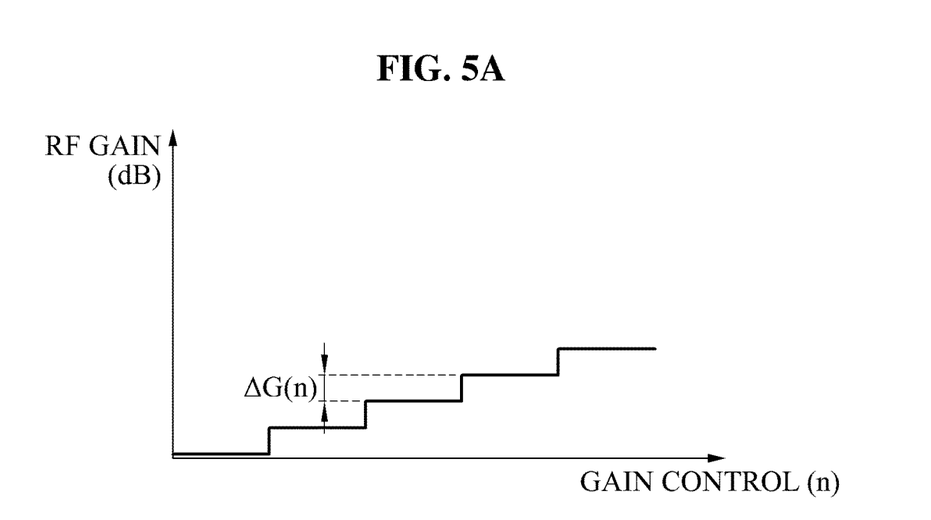
FIGS. 5A through 5C are graphs illustrating a gain control implementation, in accordance with one or more embodiments.
Figure 5B:
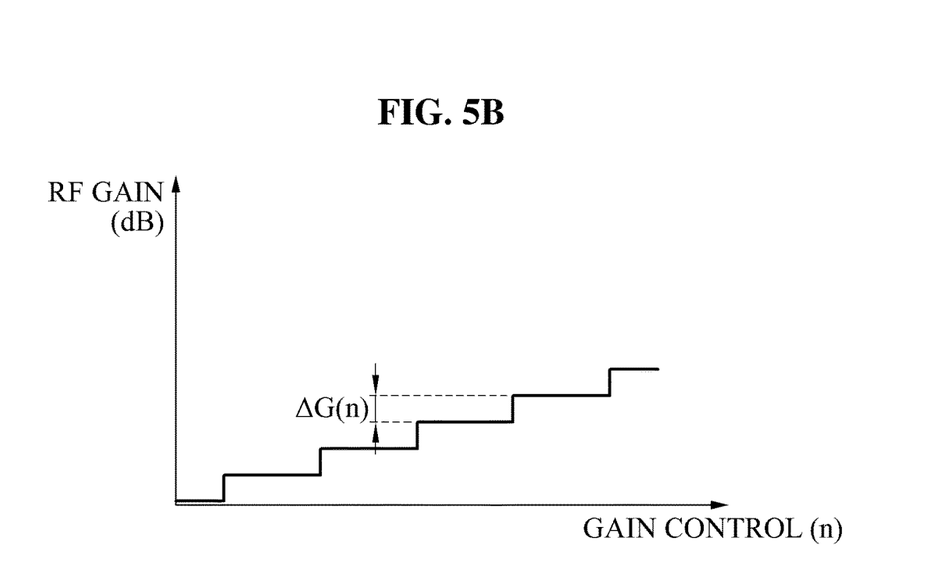

FIGS. 5A through 5C are graphs illustrating a gain control implementation, in accordance with one or more embodiments. As illustrated in FIGS. 5A and 5B, a corresponding receiver may be gain controlled with a unit step of a gain of a wireless frequency band and a unit step of a gain of a base band that are identical. Alternatively, the unit step of the gain of the wireless frequency band and the unit step of the gain of the base band may be adjusted to be almost identical, or within a predetermined range, in order for an increase amount of a total gain of the receiver to have a predetermined step increment. Accordingly, each of the gain of the wireless frequency band and the gain of the base band of the corresponding receiver may be provided to have fine unit steps, e.g., at least relative to the large unit step of FIG. 3A. Here, it is noted that the size of the fine unit step in FIGS. 5A and 5B is illustrated as being enlarged or exaggerated for ease of description. For example, FIG. 5A may illustrate an exaggeration of each of the fine unit steps that are collectively illustrated as a straight line in FIG. 4A. Similarly, FIG. 5B may illustrate an exaggeration of each of the corresponding consecutive fine unit steps that are collectively illustrated as a straight line in FIG. 4A, and similarly illustrated with different scale in FIG. 3B, as only an example.

Figure 5C:
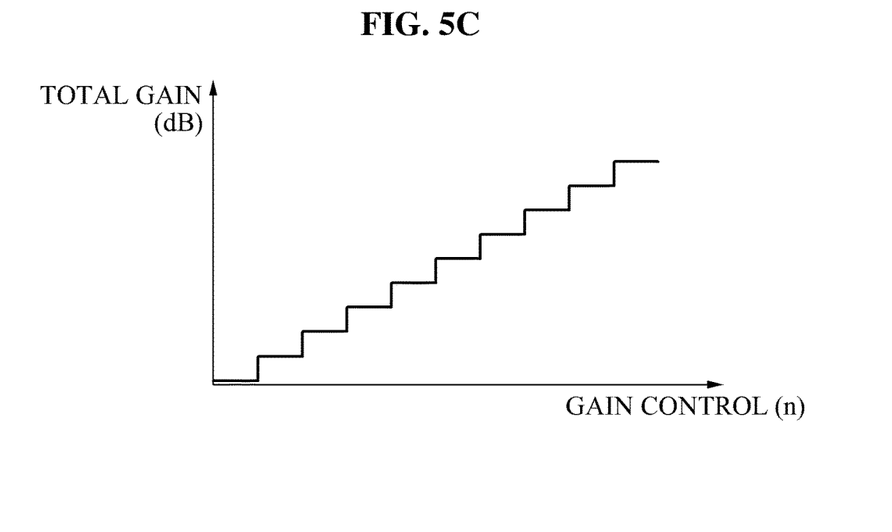

FIG. 5A illustrates the gain of a wireless frequency band according to an increase in a total gain of the receiver, FIG. 5B illustrates a gain of a base band according to the increase in the total gain of the receiver, and FIG. 5C illustrates a total gain of the receiver according to the increase in the total gain of the receiver. Each of the gain of the wireless frequency band and the gain of the base band is provided to have the fine unit step ΔG(n).

Hereinafter, using the illustrated gains of FIGS. 5A and 5B, an AGC method of maintaining a gain ratio between the gain of the wireless frequency band and the gain of the base band within a target range, e.g., while achieving a required or desired total gain of the corresponding receiver, will be described in detail.

In an embodiment, any one of the gain of the wireless frequency band and the gain of the base band may be increased while the other gain is maintained, as illustrated in FIGS. 5A and 5B, when the total gain of the receiver increases by a unit step. For example, when the gain of the wireless frequency band is increased by a unit step the gain of the base band may be maintained, and the gain of the wireless frequency band may be maintained while the gain of the base band is increased by a unit step, resulting in the total gain of the receiver being respectively changed by each of the unit steps, as illustrated in FIG. 5C. This can result in a noise figure with linear characteristics, similar to the noise figure of FIG. 4D.

Conversely, referring to FIGS. 3A and 3B, with a receiver that is controlled to increase a gain of a wireless frequency band in a relatively large unit step, intervals in time occur during which simultaneous large decreases in the gain of the base band and large increases in the gain of the wireless frequency band occur, e.g., so as to maintain a constant output level relative to the example decreasing input RF level. Thus, with such a receiver, a proportion of the gain of the wireless frequency band among the total gain increases during such intervals. Accordingly, though the total desired gain of such a receiver may be obtained, the resulting total noise figure of such a receiver may not be linear or may have non-linear characteristics.

Rather, with a receiver that is controlled to increase the gain of the wireless frequency band in a fine unit step, when the total gain of the receiver is increased by a unit step and any one of the gain of the wireless frequency band or the gain of the base band is controlled to be changed by such respective fine unit steps, such as discussed above with regard to FIGS. 5A and 5B, intervals during which the corresponding gain ratio is largely changed do not occur. Thus, with this gain control, with the fine unit step gain control of the wireless frequency band, the gain ratio between the gain of the wireless frequency band and the gain of the base band may be maintained within a target range while also achieving a required or desired total gain of the receiver.

In an embodiment, an AGC may alternately increase the gain of the wireless frequency band and the gain of the base band as illustrated in FIGS. 5A and 5B, when the total gain of the receiver increases by a unit step a plurality of times. In an embodiment, when the AGC changes the total gain of the receiver by a unit step, for a plurality of times, the AGC may control the gain of the wireless frequency band and the gain of the base band so that during an interval any one of the gain of the wireless frequency band and the gain of the base band consecutively increases or consecutively decreases.

As another example, referring to FIGS. 3A and 3B, in terms of a receiver controlling the gain of a wireless frequency band in a relatively large unit step, when the total gain of the receiver increases by a unit step for a plurality of times, an interval during which only the gain of the base band consecutively increases may be generated in a state of the gain of the wireless frequency band being fixed or maintained. Thus, a proportion of the gain of the base band among the total gain consecutively increases during such an interval. Accordingly, as noted above, while a desired total gain of such a receiver may be obtained, the resulting total noise figure of such a receiver may not be linear or may include non-linear characteristics.

In terms of a receiver controlling the gain of a wireless frequency band in a fine unit step, when a corresponding AGC changes the total gain of the receiver by a unit step for a plurality of times, the AGC may control the gain of the wireless frequency band and the gain of the base band so that the gain of the wireless frequency band and the gain of the base band are not consecutively increased or consecutively decreased, but rather, the gain of the wireless frequency band or the gain of the base band may alternately be increased or decreased. Accordingly, compared to the generated intervals of time during which the gain ratio is largely changed with a receiver whose gain is controlled according to FIGS. 3A and 3B, the gain ratio for the alternating fine unit step increases or decreases of the wireless frequency band and the base band, for example, does not include such generated intervals. Further, with the alternating fine unit step increases or decreases, the AGC may control the gain ratio between the gain of the wireless frequency band and the gain of the base band to be maintained within the target range to achieve the required or desired total gain.

FIG. 6 is a diagram illustrating a receiver system, in accordance with one or more embodiments. A receiver may include an AGC 630 to control a variable gain amplifier in different frequency bands. The block diagram of FIG. 6 illustrates the receiver with plural variable amplifiers and an AGC, and represents that there may also be additional aspects of the receiver system in addition to the plural variable amplifiers and the AGC, depending on embodiment. The receiver may amplify a received input signal in a plurality of frequency bands, such that an output signal has a required or desired amplitude. Accordingly, the AGC 630 controls a plurality of variable gain amplifiers to amplify a signal in the plurality of frequency bands.

In detail, the receiver amplifies a signal of a first frequency band received from an antenna, for example, according to a first variable gain in the first frequency band using a first variable gain amplifier 610. The receiver generates a signal of a second frequency band by frequency converting the signal of the first frequency band amplified by the first variable gain amplifier 610. The receiver amplifies the signal of the second frequency band according to a second variable gain in the second frequency band using a second variable gain amplifier 620. The receiver generates an output signal by digitizing the signal of the second frequency band, amplified by the second variable gain amplifier 620, using analog to digital converter 660. The AGC 630 controls the first variable gain and the second variable gain such that the output signal has the required or desired amplitude. In an example, the first frequency band corresponds to at least one of a wireless frequency or RF band and an intermediate frequency band and the second frequency band corresponds to a base band.

The receiver further includes a gain ratio controller (GRC) 640 to set a target range of a gain ratio between the first variable gain and the second variable gain. In an embodiment, the GRC 640 sets the target range based on the gain ratio to be achieved using a thermometer code. To optimize performance of the receiver, gain control may be selectively implemented so as to obtain a high linearity characteristic of the receiver where a proportion of a gain of a wireless frequency band among a total gain is low, and/or gain control may be selectively implemented so as to obtain a low linearity characteristic of the receiver where the proportion of the gain of the wireless frequency band among the total gain is high. The GRC 640 may set the target range to thereby selectively obtain the high linearity characteristic or the low linearity characteristic according to a desired performance.

The receiver may further include an interference detector to detect an interference greater than a predetermined threshold value. For example, the interference detector includes a filter 655 and a received signal strength indicator (RSSI) 650.

The GRC 640 may set the target range based on whether the interference is determined, by the interference detector, to be greater than a threshold value. For example, in response to the interference being determined to meet, or be greater than, the threshold value, the GRC 640 may decrease the proportion of the gain of the wireless frequency band among the total gain and accordingly set the target range to obtain the high linearity characteristic. Conversely, in response to the interference being determined to not meet, or be less than or equal to, the threshold value, the GRC 640 may increase the proportion of the gain of the wireless frequency band among the total gain and accordingly set the target range to obtain the low linearity characteristic.

FIG. 7 is a diagram illustrating a receiver system, in accordance with one or more embodiments. A receiver includes an AGC 750 to control a variable gain amplifier in different frequency bands. The block diagram of FIG. 7 illustrates the receiver with plural variable amplifiers and an AGC, and represents that there may also be additional aspects of the receiver system in addition to the plural variable amplifiers and the AGC, depending on embodiment. The receiver may amplify a received input signal in a plurality of frequency bands, such that an output signal has a required or desired amplitude. Accordingly, the AGC 750 controls a plurality of variable gain amplifiers to amplify a signal in the plurality of frequency bands.

In detail, the receiver amplifies a signal of a first frequency band received from an antenna, for example, according to a first variable gain in the first frequency band using a first variable gain amplifier 710. The receiver generates a signal of a second frequency band by frequency converting the signal of the first frequency band amplified by the first variable gain amplifier 710. The receiver amplifies the signal of the second frequency band according to a second variable gain in the second frequency band using a second variable gain amplifier 720. The receiver generates a signal of a third frequency band by frequency converting the signal of the second frequency band amplified by the second variable gain amplifier 720. The receiver amplifies the signal of the third frequency band according to a third variable gain using third variable gain amplifiers 730 and 740. The receiver generates respective output signals by digitizing the signal of the third frequency band, amplified by the third variable gain amplifiers 730 and 740, e.g., respectively using analog to digital converters 760 and 765. The AGC 750 may control the first variable gain, the second variable gain, and the third variable gain such that the output signal has the required or desired amplitude. In an embodiment, the first frequency band corresponds to a wireless frequency band, the second frequency band corresponds to an intermediate frequency band, and the third frequency band corresponds to a base band.

The AGC 750 controls the first variable gain, the second variable gain, and the third variable gain in order to selectively increase or decrease a linearity of a total noise figure. In an example, a total gain may be controlled by maintaining a gain ratio among the first variable gain, the second variable gain, and the third variable gain within a particular target range. In an example, the AGC 750 increases any one of a sum of the first variable gain and the second variable gain, and the third variable gain and maintains another, when the total gain increases by a unit step. In an example, the AGC 750 may alternate between increasing the sum of the first variable gain and the second variable gain and increasing the third variable gain when the total gain increases by a unit step for a plurality of times. In an example, when the total gain of the receiver increases, a change amount for a total gain of the receiver may be changed by a predetermined step. As a non-limiting example, at least one unit step of a first variable gain amplifier and a second variable gain amplifier and a unit step of a third variable gain amplifier may be provided to be identical.

Figure 8:
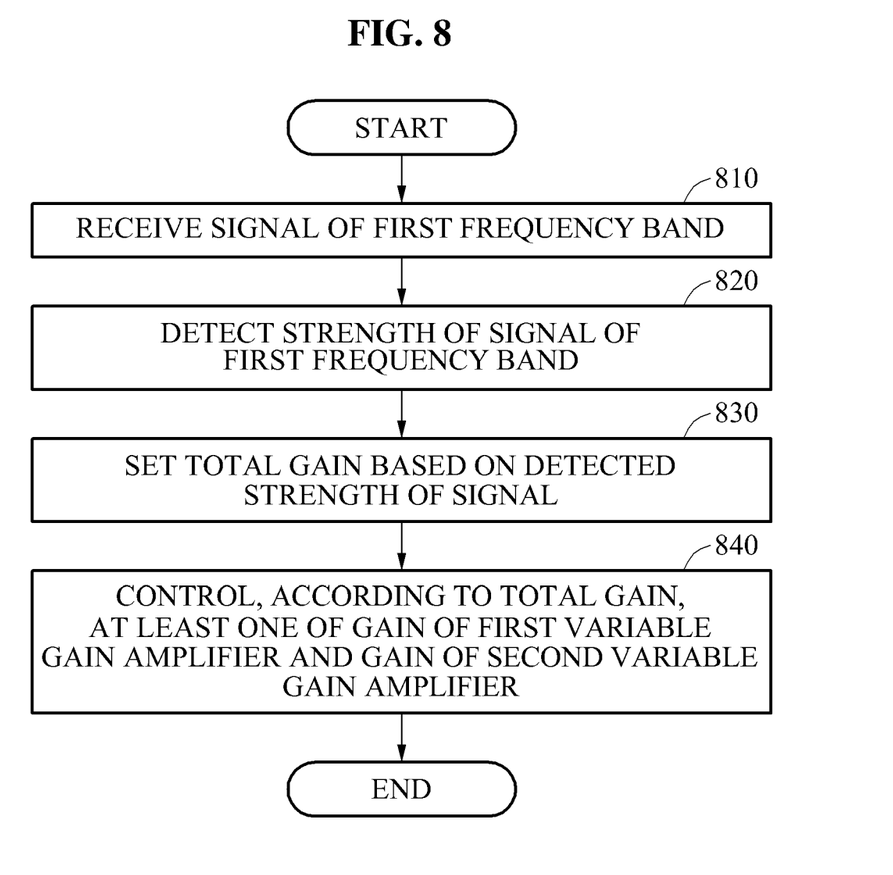
FIG. 8 is a flowchart illustrating a receiving method, in accordance with one or more embodiments.

FIG. 8 is a flowchart illustrating a receiving method, accordance with one or more embodiments. The receiving method may include controlling variable gain amplifiers in different frequency bands, thereby generating an amplified signal based on the controlled variable gain amplifiers, and generating a digital output signal from the amplified signal. As only non-limiting examples, the receiving method may be performed with respect to any of the receiver systems of FIG. 1, 6, or 7, noting that the receiving method may be alternatively implemented as well.

In operation 810, a signal of a first frequency band may be received. For example, the signal of the first frequency band may be received using an antenna of the receiver.

In operation 820, a strength of the signal of the first frequency band may be detected. In an embodiment, an output signal of the receiver may be set to have an amplitude having a predetermined value irrespective or independent of the received strength of the input signal. To perform AGC so that the output signal of the receiver has the amplitude having the predetermined value, the strength of the received input signal of the first frequency band may be detected.

In operation 830, a total gain may be set based on the detected strength of the signal of the first frequency band. The total gain of the receiver may be set in inverse proportion to the detected strength of the input signal. For example, when the detected strength of the input signal has a relatively low value, the total gain may be set to have a relatively high value. FIG. 2 illustrates an example of the setting of a total gain of the receiver for regularly maintaining a final stage amplitude of the resulting output signal.

In operation 840, according to the total gain, at least one of a first variable gain corresponding to a set gain of a first variable gain amplifier may be controlled to amplify the signal of the first frequency band and a second variable gain corresponding to a set gain of a second variable gain amplifier may be controlled to amplify a signal of a second frequency band generated by frequency converting the amplified signal of the first frequency band. In an example, the receiving method may include maintaining a gain ratio between the first variable gain and the second variable gain within a set target range. For example, the receiving method may include controlling the gain ratio between the first variable gain and the second variable gain to be within a desired or set target range to maintain a required or desired total gain of a corresponding receiver. In an embodiment, the first frequency band corresponds to at least one of a wireless or RF frequency band and an intermediate frequency band, and the second frequency band corresponds to a base band.

In an embodiment, the receiving method includes setting the target range according to a particular set gain ratio based on a detected strength of the input signal of the first frequency band. For example, when a channel condition is good or the receiver is operating in a short distance communication environment, the strength of the received signal may be relatively high. In this case, since there may be a lesser desire or requirement for a high linearity characteristic of the receiver, e.g., because of the detected strength of the received signal, performance of the underlying receiver may be optimized, for example, by increasing a proportion of a gain of the wireless frequency band among the total gain. For example, the increase in the proportion of the gain of the wireless frequency band may be implemented by increasing a corresponding unit step size for the variable amplification of the wireless frequency band. Differently, when the channel condition is bad or the receiver is operating in a long distance communication environment, the strength of the received signal may be relatively low. In this case, since there may be a greater desire or requirement for the high linearity characteristic of the receiver, e.g., because of the detected strength of the received signal, the performance of the underlying receiver may be optimized, for example, by decreasing the proportion of the gain of the wireless frequency band among the total gain. For example, the decrease in the proportion of the gain of the wireless frequency band may be implemented by decreasing a corresponding unit step size for the variable amplification of the wireless frequency band. Through this, the receiving method may include setting the target range according to the gain ratio to be achieved based on a determination of the channel condition or the communication environment.

In an embodiment, the receiving method may include increasing any one of the first variable gain and the second variable gain while maintaining the other, when the total gain increases by a unit step for maintaining the gain ratio within the target range. Also, the receiving method may include alternately increasing the first variable gain and the second variable gain when the total gain increases by a unit step for a plurality of times for maintaining the gain ratio within the target range. Through this, the receiving method may include selectively enhancing a linearity of a total noise figure by controlling the gain ratio between the first variable gain and the second variable gain within the target range. The linearity characteristic of the noise figure may be an advantage when a power consumption of the receiver, for example, is optimized.

In addition to the receiver elements of FIGS. 1, 6, and 7 being hardware elements, the methods of FIGS. 2-5C and 8 may be implemented by hardware components, including any above discussed example hardware elements and/or one or more processing devices, or processors, or computers, and the receiver apparatus and system of FIGS. 1, 6, and 7 may similarly be included in an electronic device embodiment as hardware components. Hardware components may include, as only examples, resistors, capacitors, inductors, power supplies, frequency generators, operational amplifiers, power amplifiers, low-pass filters, high-pass filters, band-pass filters, analog-to-digital converters, digital-to-analog converters, controllers, sensors, generators, drivers, and circuitry configured to implement any of the gain control and/or interference detection operations, as well as processing device(s), processor(s), and/or computer(s) to implement such AGC, GRC, or interference detection operations or other illustrated components of the receiver system or electronic device embodiment that includes the receiver system. Such a processing device, processor, or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing instructions or software that are executed by the processing device, processor, or computer and that may control the processing device, processor, or computer to implement one or more methods described herein. Hardware components implemented by a processing device, processor, or computer may execute instructions or software, such as an operating system (OS) and one or more software applications that run on the OS, to perform or control the operations described herein with respect to FIGS. 2-5C and 8, for example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-5C and 8 that perform the operations described herein may be performed or controlled by a processing device, processor, or a computer as described above executing instructions or software to perform the operations described herein.

Instructions or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the instructions or software include machine code that is directly executed by the processing device, processor, or computer, such as machine code produced by a compiler. In another example, the instructions or software include higher-level code that is executed by the processing device, processor, or computer using an interpreter. Based on the disclosure herein, and after an understanding of the same, programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processing device, processor, or computer to implement the hardware components, such as discussed in any of FIGS. 1, 6, and 7, and perform the methods as described above in FIGS. 2-5C and 8, and any associated data, data files, and data structures, are recorded, stored, or fixed in or on one or more non-transitory computer-readable storage media. Examples of a non-transitory computer-readable storage medium include read-only memory (ROM), random-access memory (RAM), dynamic random-access memory (D-RAM), static random-access memory (S-DRAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processing device, processor, or computer so that the processing device, processor, or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processing device, processor, or computer.

As a non-exhaustive example only, and in addition to the above explanation of potential hardware implementations of the receiver system, an electronic device embodiment herein, such as an electronic device embodiment that includes the receiver system of FIGS. 1, 6, and 7 as only an example, may also be a mobile device, such as a cellular phone, a smart phone, a wearable smart or bio-signal device, a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a television or display, a DVD player, a Blu-ray player, a set-top box, or a home appliance, an Internet of Things device, or any other mobile or stationary device, e.g., capable of wireless or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed is:

1. A receiver to perform an automatic gain control (AGC), the receiver comprising:
   a first variable gain amplifier configured to amplify, according to a first variable gain, a signal of a first frequency band;
   a second variable gain amplifier configured to amplify, according to a second variable gain, a signal of a second frequency band generated by frequency converting the amplified signal of the first frequency band; and an AGC circuit configured to perform an adjusting of a total gain of the first variable gain amplifier and the second variable gain amplifier to compensate for a change in an amplitude of the signal of the first frequency band by controlling gain ratios between the first variable gain and the second variable gain to each be maintained within a set target range during and through a performing of adjustments of the first variable gain and the second variable gain for the adjusting of the total gain.

2. The receiver of claim 1, wherein the first frequency band corresponds to at least one of a wireless frequency band and an intermediate frequency band, and the second frequency band corresponds to a base band.

3. The receiver of claim 1, wherein the AGC circuit controls the total gain to increase by a unit step in each of the alternate adjustments, including selectively increasing the first variable gain while maintaining the second variable gain and increasing the second variable gain while maintaining the first variable gain.

4. The receiver of claim 1, wherein the AGC circuit controls the total gain to increase by a unit step, for a plurality of times for the adjusting of the total gain, respectively through each of alternate increasings of the first variable gain and the second variable gain.

5. The receiver of claim 1, wherein a unit step of the first variable gain amplifier and a unit step of the second variable gain amplifier are respectively set by the AGC circuit so the total gain respectively changes in alternate adjustments by a predetermined unit step for the adjusting of the total gain.

6. The receiver of claim 1, further comprising:
a gain ratio controller (GRC) configured to adjust the target range.

7. The receiver of claim 6, further comprising:
an interference detector configured to detect an interference from the signal of the second frequency band and to determine whether the detected interference meets a threshold,
wherein the GRC is configured to selectively adjust the target range based on the determination.

8. The receiver of claim 7, wherein the interference detector comprises a filter and a received signal strength indicator (RSSI), the RSSI being configured to measure a signal strength of the signal of the second frequency band.

9. The method of claim 1, further comprising determining a strength of the signal of the first frequency band and setting the target range based on the determination.

10. A receiver to perform an automatic gain control (AGC), the receiver comprising:
a first variable gain amplifier configured to amplify, according to a first variable gain, a signal of a wireless frequency band;
a second variable gain amplifier configured to amplify, according to a second variable gain, a signal of an intermediate frequency band generated by frequency converting the amplified signal of the wireless frequency band;
a third variable gain amplifier configured to amplify, according to a third variable gain, a signal of a base band generated by frequency converting the amplified signal of the intermediate frequency band; and
an AGC circuit configured to control a total gain by controlling gain ratios between a combined gain, of a sum of both of the first variable gain and the second variable gain, and the third variable gain to each be maintained within a set target range during and through a performing of respective adjustments of the combined gain and the third variable gain.

11. The receiver of claim 10, wherein the AGC circuit controls the total gain to increase by a unit step in each of alternating adjustments, of selectively increasing the combined gain while maintaining the third variable gain and increasing the third variable gain while maintaining the combined gain.

12. The receiver of claim 10, wherein the AGC circuit controls the total gain to increase by a unit step, for a plurality of times, through each of alternate increasings the combined gain and the third variable gain.

13. The receiver of claim 10, wherein a unit step of the second variable gain amplifier and a unit step of the third variable gain amplifier are respectively set by the AGC circuit so the total gain respectively changes in each of alternate adjustments by a predetermined unit step.

14. The receiver of claim 10, further comprising:
a gain ratio controller (GRC) configured to adjust the target range.

15. The receiver of claim 14, further comprising:
an interference detector configured to detect an interference from the signal of the base band and to determine whether the detected interference meets a threshold,
wherein the GRC is configured to selectively adjust the target range based on the determination.

16. A receiving method with automatic gain control (AGC), the method comprising:
setting a total gain based on a strength of a received signal of a first frequency band; and
compensating for a change in an amplitude of the received signal of the first frequency band by respectively adjusting, according to the set total gain and to maintain an output signal strength, a first variable gain of a first variable gain amplifier configured to amplify the signal of the first frequency band and a second variable gain of a second variable gain amplifier configured to amplify a signal of a second frequency band generated by frequency converting the amplified signal of the first frequency band,
wherein the respective adjusting of the first variable gain and second variable gain are each performed with a maintaining of respective gain ratios between the first variable gain and the second variable gain each within a set target range for the compensating of the change in the amplitude of the received signal.

17. The method of claim 16, further comprising determining the strength of the received signal of the first frequency band and setting the target range based on the determination.

18. The method of claim 16, further comprising controlling the total gain to increase by a unit step in each of the respective adjustments, including selectively increasing the first variable gain while maintaining the second variable gain and increasing the second variable gain while maintaining the first variable gain.

19. A receiving method with automatic gain control (AGC), the method comprising:
setting a total gain based on a strength of a received signal of a first frequency band;
generating an output signal by selectively adjusting, according to the set total gain, a first variable gain of a first variable gain amplifier configured to amplify the signal of the first frequency band and a second variable gain of a second variable gain amplifier configured to amplify a signal of a second frequency band generated by frequency converting the amplified signal of the first frequency band; and controlling, in the generating of the output signal, the total gain to increase by a unit step for each of a plurality of times through respective alternate increases of the first variable gain and the second variable gain.

* * * * *